June 8, 1948.  E. O. SCHWEITZER, JR  2,442,782
ELECTRIC MOTOR CONSTRUCTION
Filed Aug. 9, 1946

Inventor:
Edmund O. Schweitzer, Jr.
By Brown, Jackson, Boettcher & Dienner
Attys.

Patented June 8, 1948

2,442,782

UNITED STATES PATENT OFFICE 2,442,782

ELECTRIC MOTOR CONSTRUCTION

Edmund O. Schweitzer, Jr., Northbrook, Ill.

Application August 9, 1946, Serial No. 689,426

6 Claims. (Cl. 172—278)

My invention relates, generally, to dynamo-electric devices, and it has particular relation to synchronously operating devices such as motors.

This invention constitutes an improvement over the invention disclosed in my co-pending application Serial No. 578,485, filed February 17, 1945.

Among the objects of this invention are: To avoid the necessity for reversing one of the phases between the rotors in the construction disclosed in my co-pending application above referred to; to operate a motor at synchronous speed by employing one phase of a polyphase winding in cooperation with a unidirectional field; to extend one phase from a polyphase rotor arranged to cooperate with alternating flux to a tandem mounted rotor arranged to cooperate with unidirectional flux; and to interconnect only the ends of the conductors of the single and polyphase windings at the ends of the respective rotors.

Other objects of my invention will, in part, be obvious, and in part appear hereinafter.

My invention is disclosed in an embodiment thereof shown in the accompanying drawing, and it comprises the features of construction, combination of elements and arrangement of parts, which will be exemplified in the construction hereinafter set forth, and the scope of the application of which will be indicated in the appended claims.

Figure 1:
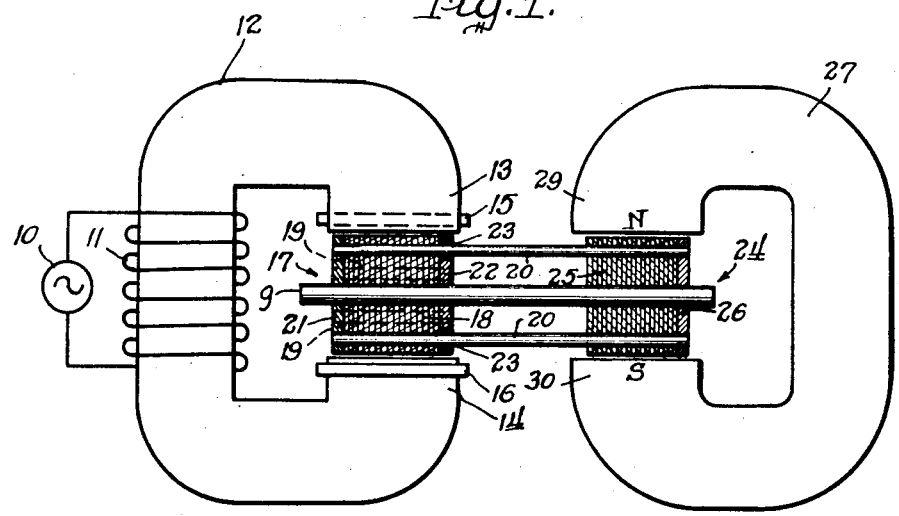
Figure 2:
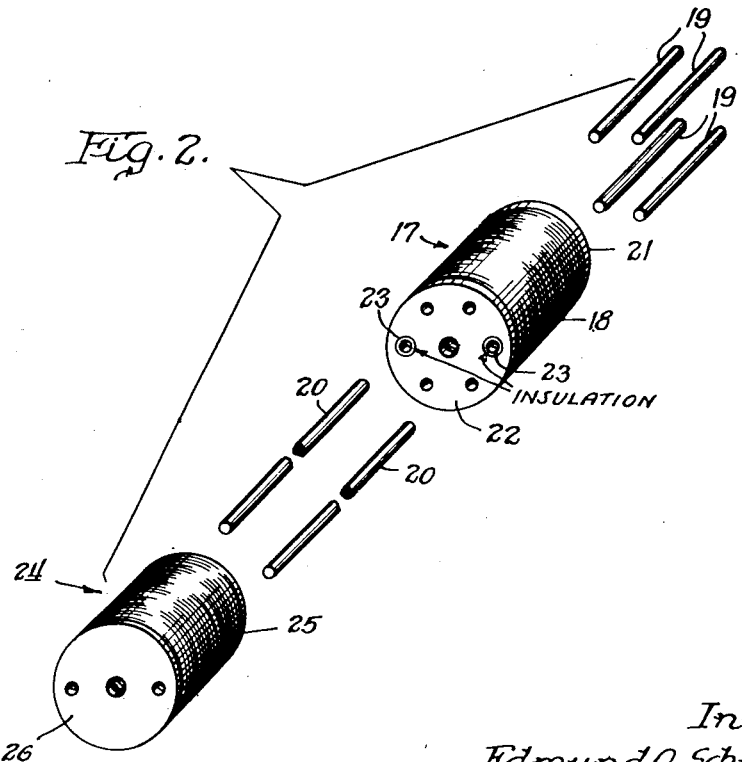

For a more complete understanding of the nature and scope of my invention, reference may be had to the following detailed description, taken together with the accompanying drawing, in which:

Figure 1 illustrates, diagrammatically, a preferred embodiment of the present invention; and Figure 2 is a perspective view of the rotors and the conductors making up the single and polyphase windings, the conductors being shown apart from the rotors in order to more clearly illustrate the details of construction.

Referring now to the drawing, it will be observed that the reference character 10 designates a source of alternating current, such as a 60-cycle source. The source 10 is arranged to energize the winding 11, that may be located on a generally C-shaped core 12 of suitable laminated magnetic material. The core 12 has pole extensions 13 and 14, facing each other, which have located therein shading windings 15 and 16 for shifting the flux to provide starting torque for a rotor which is indicated, generally, at 17.

It will be understood that the rotor 17 is arranged to rotate in an alternating field, which is generated between the pole extensions 13 and 14 by the coil 11.

The rotor 17 may be formed of a stack of laminations 18 of magnetic material, and may be mounted for rotation on a shaft 9. The rotor 17 is provided with a polyphase winding which is made up of conductors 19 and 20. The conductors 19 and 20 may be in the form of round copper wires, and they are interconnected at the left-hand end of the rotor 17 by a copper plate 21. It will be understood that the conductors 19 and 20 are insulated from the rotor 17, more particularly from the laminations 18 making up the magnetic circuit of the same. This may be accomplished by any suitable means, such as by providing the conductors 19 and 20 with a coating of insulating enamel. The other ends of the conductors 19 are interconnected by a plate 22 of copper at the other end of the rotor 17.

The conductors 20, which form one phase of the polyphase winding on the rotor 17, are not connected by the plate 22. Rather, they extend therethrough and are insulated therefrom. Suitable insulating bushings 23 are provided for insulating the conductors 20 from the copper plates 22. It will be understood that the bushings 23 may be omitted, and reliance placed solely on the enamel insulation on the conductors 20 for insulating them from the plate 22.

It will be observed that the conductors 20 extend through a rotor which is indicated, generally, at 24. The rotor 24 comprises laminations 25 of a suitable magnetic material, and is mounted in tandem relation to the rotor 17, preferably on the same shaft. The conductors 20 are interconnected at the right-hand end of the rotor 24 by a copper plate 26.

In order to provide synchronous operating characteristics, the rotor 24 is caused to rotate in a unidirectional field, which may be provided by any suitable means such as by a permanent magnet, which is indicated at 27. The permanent magnet 27 has pole extensions 29 and 30, which may have the polarities indicated, and between which the rotor 24 is arranged to rotate. The single phase winding formed by the conductors 20 cooperates with this unidirectional field to provide the desired synchronous operating characteristics.

In the particular embodiment of the invention disclosed in the drawing, when the source 10 is a 60-cycle source, the rotors 17 and 24 will rotate at a speed of 1800 R. P. M.

By extending only one phase of the polyphase winding on the rotor 17 to the rotor 24, it is unnecessary to reverse a phase as is required in the construction disclosed in my copending application above referred to. However, I find that a greater strength of unidirectional field is required in practicing the present invention over that which is required in practicing the invention disclosed in my copending application.

Since certain changes can be made in the foregoing construction, and different embodiments of the invention can be made without departing from the spirit and scope thereof, it is intended that all matter shown in the accompanying drawing and described hereinbefore shall be interpreted as illustrative and not in a limiting sense.

I claim as my invention:

1. A synchronous alternating current dynamoelectric device comprising, in combination, a first stator arranged and adapted to provide an alternating flux, a second stator arranged and adapted to provide a unidirectional flux, a polyphase winding for cooperating with said alternating flux, a single phase winding forming an extension of one of the phases of said polyphase winding for cooperating with said unidirectional flux, and means commonly mounting said windings for conjoint rotation.

2. A synchronous alternating current dynamoelectric device comprising, in combination, a first stator arranged and adapted to provide an alternating flux, a second stator arranged and adapted to provide a unidirectional flux, a first rotor for said first stator, a second rotor for said second stator, means commonly mounting said rotors for conjoint rotation, a polyphase winding on said first rotor, and a single phase winding on said second rotor constituting an extension of one of the phases of said polyphase winding.

3. A synchronous alternating current dynamoelectric device comprising, in combination, a first stator arranged and adapted to provide an alternating flux, a second stator arranged and adapted to provide a unidirectional flux, a first rotor for said first stator, a second rotor for said second stator, means commonly mounting said rotors in tandem for conjoint rotation, a plurality of conductors extending lengthwise of said first rotor around its periphery, a conductor at the outer end of said first rotor interconnecting all of said conductors, a conductor at the inner end of said first rotor adjacent said second rotor interconnecting all but two of said conductors, a pair of conductors forming extensions of said two conductors and extending lengthwise of said second rotor and located on opposite sides of its periphery, and a conductor at the outer end of said second rotor interconnecting said pair of conductors.

4. The invention, as set forth in claim 3, wherein the conductors at the ends of the rotors are in the form of plates and the two conductors on the first rotor extending toward the second rotor are insulated from the plate at the inner end of said first rotor.

5. A synchronous alternating current dynamoelectric device comprising, in combination, a first stator arranged and adapted to provide an alternating flux, a second stator arranged and adapted to provide a unidirectional flux, a polyphase winding for cooperating with said alternating flux, a single phase winding forming an extension of said polyphase winding for cooperating with said unidirectional flux, and means commonly mounting said windings for conjoint relation.

6. A synchronous alternating current dynamoelectric device comprising, in combination, a first stator arranged and adapted to provide an alternating flux, a second stator arranged and adapted to provide a unidirectional flux, a first rotor for said first stator, a second rotor for said second stator, means commonly mounting said rotors for conjoint rotation, a polyphase winding on said first rotor, and a single phase winding on said second rotor constituting an extension of said polyphase winding.

EDMUND O. SCHWEITZER, Jr.